Aug. 27, 1963
W. L. DOBENS
3,102,193
APPARATUS FOR TREATING ALL SURFACES OF A THERMOPLASTIC
TUBE WITH CORONA DISCHARGE
Filed May 21, 1959
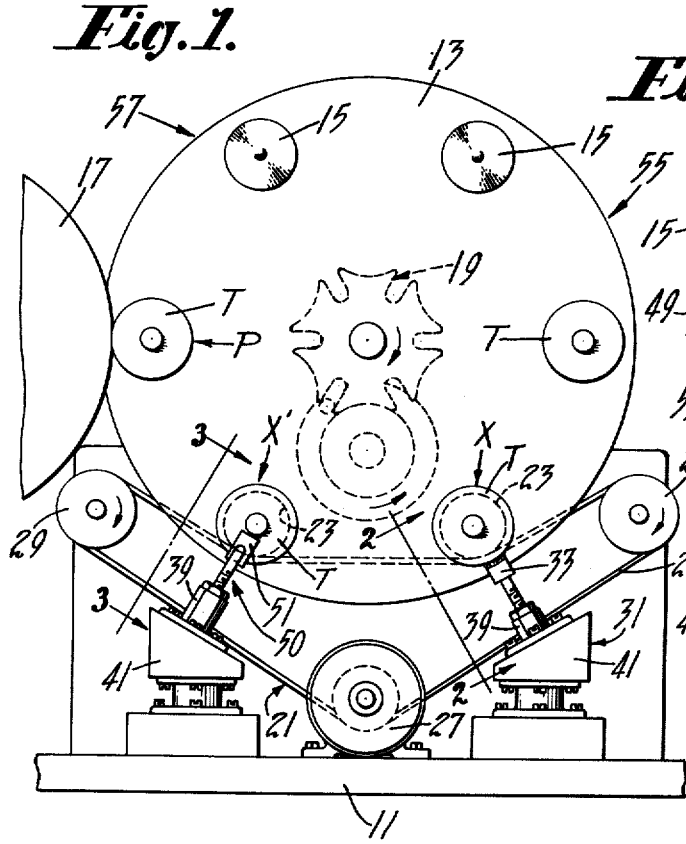
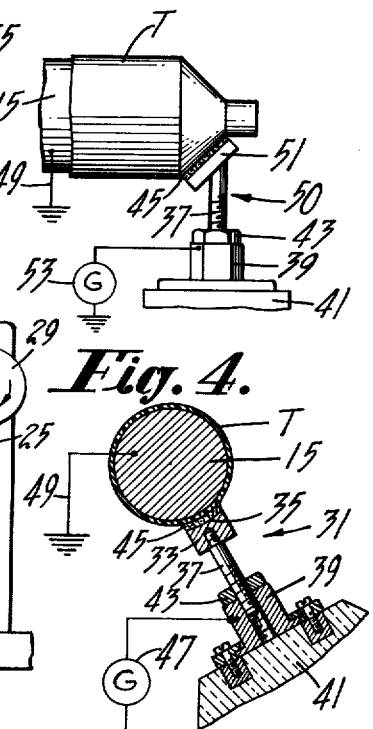
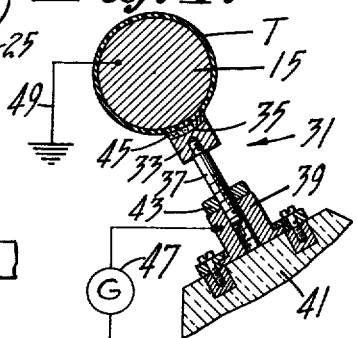
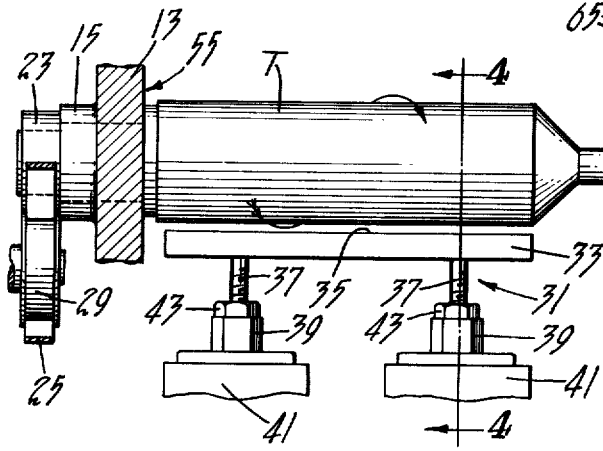
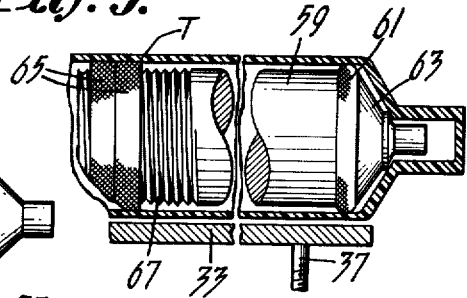
INVENTOR.
WILLIAM LEONARD DOBENS
BY Russell L. Root
George W. Reiber
ATTORNEYS

United States Patent Office 3,102,193
Patented Aug. 27, 1963

3,102,193
APPARATUS FOR TREATING ALL SURFACES OF A THERMOPLASTIC TUBE WITH CORONA DISCHARGE
William Leonard Dobens, Nashua, N.H., assignor to American Can Company, New York, N.Y., a corporation of New Jersey
Filed May 21, 1959, Ser. No. 814,916
5 Claims. (Cl. 250—49.5)

The present invention relates to the surface treatment of thermoplastic tubing and tubular containers for the reception of protective and decorative coating, inks, adhesives and the like, in a manner which causes them to readily and firmly adhere thereto, and has particular reference to an improved apparatus for treating the surfaces with an electrical corona discharge.

The corona treating of the surface of thermoplastic tubes and containers, as opposed to the treating of continuous film, offers certain notable problems of handling and treatment speed that have been serious drawbacks to the adoption of this method, because adequate rates of treatment to keep in step with the other tube production operations could not be achieved.

These problems have in part been solved by the methods and and devices shown in U.S. Patents 2,876,358, 2,957,077 and 3,017,339. There are, however, other respects in which the methods therein shown can be improved on especially in certain directions. Particular reference is made to the treatment of tubes or containers placed on rotary mandrels, and especially indexable rotary mandrels, a condition in which the tubes frequently find themselves for the performance of printing or other finishing operations thereon. It will be appreciated that if a suitable method of corona treatment adapted to rotary mandrel operation can be devised, then various intermediate handling steps heretofore needed can be easily avoided.

While it has been known heretofore to treat with corona discharge the surface of thermoplastic tubes mounted on indexing holders or mandrels, this invention seeks to avoid the necessity for any reciprocation of the treating electrode axially of the tube, and thus side-step the mechanical and electrical complexity associated with an arrangement of that sort. Moreover the invention seeks to achieve the above noted simplification by taking advantage of the rotary movement of the mandrels which is gratuitously available on tube finishing machines of various sorts, and hence introduces no mechanical movements not already present and usable in other connections on these machines.

An object of the present invention, therefore, is to provide for more expeditious and speedier corona treatment of thermoplastic tubes and containers than has heretofore been possible.

Another object of the invention is to provide for the corona treatment of thermoplastic tubes or containers while they are mounted on rotary mandrels of the type frequently employed in printing or other treating processes, and to do so, moreover, without the need for causing parts to move axially of the mandrel to effect treatment.

A further object of the invention is to provide for a corona treatment of thermoplastic tubes or containers as in the immediately foregoing object, and wherein the arrangement is such that tube-carrying mandrels can be readily indexed into and out of corona treating or other work performing stations without interference with the treating equipment.

In particular, it is an object of the present invention, in one aspect thereof, to provide a corona treating method and arrangement adapted to the treating of thermoplastic tubes or containers while they are on the mandrels of a rotary printing machine.

A feature of the present invention is the mounting of the thermoplastic tube on a rotary mandrel which is conductive and serves as an inner electrode, and the presentation in close proximity to but spaced from the outer surface of the tube, a rod or bar electrode in generally parallel relation to an element of the tube surface, and rotating the mandrel on its axis while impressing across the gap between the same and the bar electrode a high frequency alternating potential of sufficient value to create a corona discharge for treating the surface.

Another feature of the invention is the provision of two bar electrodes operating at different potentials for separately treating portions of the container wall having different thicknesses.

A further feature of the invention is the provision of one or more bar electrodes cooperating with indexable rotary mandrels for corona treating the surfaces of thermoplastic tubes or containers wherein the bar electrodes are so dimensioned and so located with reference to the indexing travel of the mandrels as to admit of using a rapid rotation of the mandrels, and still not interfere with the indexing thereof, or require movement of the bar electrodes to provide for such indexing movement of the mandrel.

Additionl objects, features and advantages will appear hereinafter as the description proceeds.

In the drawings:
FIG. 1 is a front elevation of the turret of a rotary tube printer showing corona treating equipment embodying the present invention;
FIG. 2 is a detail view to a larger scale, partly in section, taken substantially on line 2—2 of FIG. 1;
FIG. 3 is a detail view similar to FIG. 2, but taken substantially on line 3—3 of FIG. 1;
FIG. 4 is a section taken substantially on line 4—4 of FIG. 2;
FIG. 5 is a detail section illustrating an alternate form of the invention.

Referring to the drawings, numeral 11 represents a base on which is mounted a rotary turret 13 carrying a plurality of rotary spindles or mandrels 15 of electroconductive material designed to receive and support containers or tubes T of thermoplastic material such as polyethylene for various finishing operations. The mandrels 15 are of a diameter such as to give a snug but free sliding fit within the tubes T to be treated, and in case the tube breasts are also to be treated, are provided with a smooth conical end surface matching and lying in contact with the interior surface of the tube breast.

In the particular arrangement shown, the turret is that of a rotary printing machine and is arranged to have its mandrels cooperate in turn with a printing drum 17 at a printing station P. Suitable indexing mechanism such as the conventional Geneva movement 19 is used to intermittently rotate the turret 13 and advance the mandrels 15 from station to station.

In addition to the printing station P there are other work stations designated X and X' at which other operations may be performed on the tubes T. As each mandrel reaches either of the work stations X and X' it is rotated by suitable mechanism for the purpose. In the form shown this mechanism is designated 21 and includes a drive pulley 23 on the base end of each mandrel which runs in frictional contact with a driving belt 25 driven by a motor 27 and supported by idlers 29. The plastic tubes T are placed on mandrels 15 and indexed in turn into the work station X.

In accordance with the invention there is provided at work station X means indicated generally by numeral 31, for effecting a corona discharge treatment of the surface of the thermoplastic tube T. This takes the form of an electro-conductive bar 33 presenting as broad a face as possible to the tube. For ordinary situations it has been found that the bar can be about ⅜ to ½ inches wide. The bar runs lengthwise of the tube, is substantially parallel to an element of the body wall of the tube and extends almost the full length of a tube to be treated.

The bar 33 is so positioned as to have its longitudinal axis substantially in the radial plane passing through station X so that, even though placed in very close proximity to the tube T on mandrel 15, it will not lie in the path of nor interfere with movement of the tubes T or mandrels 15 during indexing thereof into and out of position at the station. The face 35 of the bar 33 directed towards the mandrel is preferably slightly curved so as to bring about substantial uniformity in the air gap between the bar 33 and the surface of the tube T. To ensure this uniformity and to prevent random arcing, it will be appreciated that the surfaces of both the rotary mandrel 15 and the face of electrode bar 33 are substantially smooth. By this is meant that the respective surfaces over which the corona discharge is generated are free of random raised projections or other surface irregularities, although uniform knurling or grooving such as hereinafter described in connection with the arrangement of FIGURE 5 is not considered an undesirable surface condition for effective treatment.

Any suitable insulating mounting may be used to support the bar 33 in the above described location. In the particular form shown the bar is rigidly connected to screw legs 37 which are threadedly received in screw sockets 39 rotatably mounted on the surface of insulators 41 which are provided with a suitable rigid mounting on base 11. By rotating the sockets 39 the air gap may be adjusted to suit any special conditions such as the wall thickness of the container, or the location of the bar can even be set to accommodate containers of different diameters if the mandrels 15 are demountable and interchangeable. Clamp nuts 43 may be used to fix the proper adjustment when attained.

It will be understood that, although not illustrated in detail in the drawing, the bar 33 may be made up of slidable parts for length adjustment to accommodate the tube length to be treated and to allow for adjustment for tubes of different lengths. Preferably the length of the bar 33, whether fixed or adjustable, and its positioning relative to the tube T, is such that the end of the bar 33 adjacent the open end of the tube is withdrawn slightly from a flush position with said end. This arrangement will tend to prevent the striking of a direct arc between the bar 33 and mandrel 15 around the tube end as sometimes happens, but does not have any important effect on the treatment of the tube surface since the corona demonstrates a slight spread between the electrode and the tube surface.

In order to provide the corona discharge indicated at 45 and necessary to the treatment of the tube T, suitable means of any convenient type for impressing a high frequency alternating voltage across the gap between the bar 33 and mandrel 15 is used. Shown diagrammatically in FIG. 4 for this purpose is a source 47 which may be a high frequency generator connected electrically to bar 33 and to ground. The mandrel 15, preferably via the machine frame 11, is also grounded as indicated diagrammatically at 49.

The voltage drop impressed across the gap is, of course, adjusted to suit the type of material and wall thickness being treated, and for squeezable tubular containers of the ordinary thin-wall variety, made of polyethylene, a voltage of about 5000 volts, preferably at a frequency of 500 cycles or more is found suitable. The average spacing of the bar 33 from the surface of the tube T is preferably about .030 inch, but may be more if necessary up to about .060 inch provided a slightly higher voltage source is made available.

While not so shown in the drawing, it will be understood that if the breast portion of the tube T is of substantially the same thickness as the wall portion then the bar 33 may be continued upwardly at an angle to the right in FIG. 2, parallel to the surface of the breast in order to treat that portion as well, should this be desired for any reason.

Normally the breast portion of the tube T is made substantially stiffer and thicker than the body wall portion, so that the electrical conditions for corona discharge are substantially different from those in the body area. This being the case, the present invention includes means 50 illustrated especially in FIGS. 1 and 3 for providing corona discharge treatment in the breast area if this treatment is needed for any reason. This consists of a bar electrode 51 with its axis lying substantially in the plane radial to the turret at work station X'. The bar 51 is substantially similar to the bar 33, except for being shorter and being mounted at an angle so as to parallel the breast surface of a tube on one of the mandrels 15. A suitable adjustable insulating mounting 37, 39, 41, 43 like that described for means 31 may also be employed for the means 50 as shown. The means for impressing a high voltage drop across the gap between the bar 51 and the end of the mandrel 15 to effect the corona discharge indicated at 45 may be any suitable source 53 having sufficient potential to cause the discharge, for example a high frequency generator of higher voltage than source 47, one side being connected electrically to bar 51 and the other to ground. As before, the mandrels are grounded through the machine frame as diagrammatically indicated at 49 in FIG. 4. In this instance, for tubes having breast wall thicknesses of the usual values, the source 53 may impress a drop, for example, of 20,000 volts across the gap between bar 51 and mandrel 15.

In operation the turret 13 is indexed periodically by the Geneva movement 19. At a preliminary station, for example, that designated 55 in FIG. 1, a fresh tube T to be treated may be placed on the mandrel each time the turret indexes. As each tube T is moved into station X the mandrel which carries it is brought into sufficient proximity to bar 33 to set up a corona discharge therebetween. Simultaneously the pulley 23 moves into contact with the belt 25 which is being continuously driven by the motor 27 to cause rotation of the mandrel 15. As the mandrel rotates the outer surface of the wall of the tube is progressively treated by the discharge to render it receptive to and retentive of coating materials, printing ink, adhesive and the like. The speed of mandrel rotation may be quite rapid without impairing treatment, and, inasmuch as only one or two revolutions are needed to insure proper treatment, it will be readily appreciated that the same can easily be effected well within the time limitations imposed by any other work operations, which it may be desired to conduct on the same turret.

With the next indexing operation to station X' the tube T and its mandrel 15 are brought into operative relation with bar 51 where the breast may be similarly treated by corona discharge if required. The tube T will then be indexed into another station P where other work may be performed thereon. In the arrangement shown the exterior decoration is here printed on the tube by a rotary printing drum P. Upon indexing to a subsequent station, for example that indicated at 57 in FIG. 1, the tube T in treated and printed condition will be doffed from mandrel 15 and carried away for such other treatment as required, for example travelling through a drying oven or the like.

While the foregoing description is directed primarily to the treatment of the exterior surface of the tube T on snugly fitting mandrels, with the idea of printing thereon, it should be understood that in situations where immediate printing on the same mandrels is not the object, mandrels of a different type may be employed to effectually treat both the inside and outside surfaces of the tubes T. This arrangement is shown in FIG. 5 wherein the rotary mandrel 59 provides the inner electrode. The mandrel 59 is formed with a slightly enlarged ring or collar 61 which has an outside diameter substantially equal to the inside diameter of the tubes T to provide a snug sliding fit. Outwardly of the collar 61 the mandrel is formed with a conical nose 63 to conform generally to the shape of the interior surface of the tube breast but is dimensioned to provide an air gap between the nose 63 and said surface. At the base end of the mandrel 59 are one or more collars 65 which are equal in diameter to ring 61 and which, with the ring 61, support the tube T in a position slightly but uniformly spaced from the major area of mandrel 59. The collars 65 may be threaded on a threaded portion 67 of the mandrel as indicated in order to provide for adjustment to accommodate tubes of various lengths. The outer surfaces of the collars 61 and 65 are generally and uniformly pitted, for example by knurling as shown, or by grooving, in order to provide an air gap adjacent the major portion of the interior surface of the tube wall approached by the rings, and to provide a minimum area of contact with the tube.

While, in order to comply with the statute, the invention is described in language which is rather specific as to structural features and arrangements, it is to be understood that the invention is not limited to the specific details shown, but that the means herein disclosed comprises the preferred of several modes of putting the invention into effect, and the invention is therefore claimed in any of its forms or modifications within the scope of the language employed in the appended claims.

What I claim:

1. An apparatus for treating the surfaces of thermoplastic tubes to render the same receptive to and retentive of surface coatings, which comprises a conductive mandrel for receiving individual tubes and dimensioned to have a snug sliding fit in the tubes to be treated, an axially immovable elongate smooth surfaced electrode bar extending parallel to and longitudinally of the mandrel and an adjacent surface element of the mandrel, and spaced a slight distance from the mandrel surface and from the surface of a tube placed thereon, means for indexing said conductive mandrel and tube thereon to said electrode bar, means for impressing a voltage drop between said bar and said mandrel sufficient to generate a corona discharge therebetween simultaneously along the full length of the bar, and means to rotate said mandrel together with said tube while the corona discharge is being generated.

2. An apparatus for treating the several portions of thermoplastic tubes to render the same receptive to and retentive of surface coatings, comprising a conveying means operable between spaced stations of the apparatus a rotatable conductive mandrel mounted on said conveying means for receiving individual tubes thereon and dimensioned to closely conform interiorly of said tubes to the several portions to be treated, mutually independent electrodes adajacent the path of travel of said conveying means, one positioned at one station to lie adjacent select portions of a tube on said mandrel when conveyed to said one station and another electrode at another station positioned to lie adjacent other select portions of the tube when conveyed to said another station, means for impressing a voltage drop between said mandrel and respective ones of said electrodes at said stations sufficient to generate a corona discharge therebetween to treat said several portions successively, and means to rotate said mandrel with said tube thereon at each station while the corona discharge is being generated.

3. Apparatus for treating the surfaces of thermoplastic tubes to render the same receptive to and retentive of surface coatings comprising a conductive mandrel for receiving thereon individual tubes, said mandrel being generally cylindrical and having restricted area means to support a tube at local interior points with a snug fit thereon and having a major area of its surface spaced slightly from the tube surface to provide an air gap therebetween, whereby both the interior and exterior surfaces of the tube are treated simultaneously, an elongate electrode bar extending parallel to a surface element of the mandrel and spaced a slight distance from the mandrel surface and from the surface of the tube placed thereon, means for impressing a voltage drop between said bar and said mandrel sufficient to generate a corona discharge therebetween, and means to rotate said mandrel and tube while the corona discharge is being generated.

4. Apparatus for treating the surfaces of thermoplastic tubes to render the same receptive to and retentive of surface coatings, comprising a conductive mandrel for receiving individual tubes, said mandrel being generally cylindrical and having a main outside diameter smaller than the inside diameter of the tube to provide an air gap therebetween, a plurality of collars on said mandrel in spaced relation along its length and of a diameter substantially equal to the inside diameter of the tube to snugly fit therein, the outer surfaces of the collars being generally and uniformly pitted to provide substantial air gap area adjacent the inner surface of the tube at the collars and a greatly reduced contact of the collars with the tube surface, an elongate electrode bar extending parallel to a surface element of the mandrel and spaced a slight distance from the mandrel surface and from the surface of the tube placed thereon, means for impressing a voltage drop between said bar and said mandrel sufficient to generate a corona discharge therebetween, and means to rotate said mandrel while the corona discharge is being generated.

5. An apparatus for treating the surfaces of thermoplastic tubes, comprising a succession of parallel conductive mandrels dimensioned to have a snug sliding fit in the tubes to be treated, conveying means mounting the mandrels in equally spaced relation and travelling them in a predetermined path transversely of their lengths, an elongate electrode bar disposed adjacent said path so as to be parallel to but spaced slightly from an element of the tube surface when a mandrel carrying a tube is adjacent the electrode, means to rotate each mandrel while it is adjacent to the electrode, means to impress an alternating voltage drop between the mandrel and an adjacent electrode sufficient to generate a corona discharge therebetween to render the surface of a tube on the mandrel receptive to and retentive of surface coatings, and a rotary printing drum operative simultaneously with the generation of said corona discharge for printing on the tube on another of said mandrels lying downstream from the electrode as determined by the direction of movement of said conveying means.

References Cited in the file of this patent

UNITED STATES PATENTS

| | | |
|---|---|---|
| 2,449,655 | Keiffer | Sept. 21, 1948 |
| 2,604,870 | Blood et al. | July 29, 1952 |
| 2,698,814 | Ransburg | Jan. 4, 1955 |
| 2,802,085 | Rothacker | Aug. 6, 1957 |
| 2,876,358 | Root | Mar. 3, 1959 |
| 2,894,139 | Magruder et al. | July 7, 1959 |
| 2,957,077 | Hay | Oct. 18, 1960 |